(12) United States Patent
Golden et al.

(10) Patent No.: US 8,119,910 B1
(45) Date of Patent: Feb. 21, 2012

(54) POWER AND COMMUNICATION RECEPTACLE TROUGH WITH RECEPTACLE ATTACHMENT MEMBER HAVING WAVE-LIKE CONTOUR

(75) Inventors: Kimberly Golden, Wallingford, CT (US); Dave Black, Orange, CT (US); Glenn Golden, Wallingford, CT (US); Russell Hayden, Stratford, CT (US); Jillian Pai, Chicago, IL (US); Sean Scott, Chicago, IL (US)

(73) Assignee: Premier Manufacturing Group, Inc., Shelton, CT (US)

( * ) Notice: Subject to any disclaimer, the term of this patent is extended or adjusted under 35 U.S.C. 154(b) by 775 days.

(21) Appl. No.: 12/135,097

(22) Filed: Jun. 6, 2008

Related U.S. Application Data

(60) Provisional application No. 60/943,362, filed on Jun. 12, 2007, provisional application No. 60/394,220, filed on Jun. 11, 2007.

(51) Int. Cl.
*H01H 9/02* (2006.01)
(52) U.S. Cl. .......... 174/53; 174/500; 174/482; 174/490; 220/3.2; 220/3.3; 220/4.02
(58) Field of Classification Search .............. 174/480, 174/481, 50, 53, 57, 58, 490, 484, 482, 500, 174/502; 220/3.2–3.9, 4.02; 248/906, 343; 439/535, 536, 131, 650, 638; 312/223.2, 312/223.3, 223.5, 223.6; 108/50.02
See application file for complete search history.

(56) References Cited

U.S. PATENT DOCUMENTS

| | | | | |
|---|---|---|---|---|
| 4,654,756 A * | 3/1987 | Wilson et al. | ............. | 312/223.3 |
| 4,792,881 A * | 12/1988 | Wilson et al. | ............. | 312/223.6 |
| 5,230,552 A * | 7/1993 | Schipper et al. | ........... | 312/223.6 |
| 5,231,562 A * | 7/1993 | Pierce et al. | ................... | 174/500 |
| 5,709,156 A * | 1/1998 | Gevaert et al. | ............. | 312/223.6 |
| 5,900,684 A * | 5/1999 | Lam | ............................. | 439/638 |
| 6,338,301 B1 * | 1/2002 | Almond | ....................... | 174/502 |
| 6,397,762 B1 * | 6/2002 | Goldberg et al. | .......... | 108/50.02 |
| 6,811,444 B2 * | 11/2004 | Geyer | ........................... | 439/650 |
| 6,875,051 B2 * | 4/2005 | Pizak | ............................. | 439/535 |
| 7,227,080 B2 * | 6/2007 | Kregle et al. | ................... | 174/50 |
| 7,511,231 B2 * | 3/2009 | Drane et al. | .................. | 174/482 |

* cited by examiner

*Primary Examiner* — Angel R Estrada
(74) *Attorney, Agent, or Firm* — Raymond A. Nuzzo

(57) ABSTRACT

A power and communication receptacle trough has a frame which has an upper, peripheral portion and a plurality of walls downwardly extending from the upper, peripheral portion. The frame defines an interior region. A receptacle attachment member is disposed within the interior region of the frame and is attached to the frame. The receptacle attachment member has a wave-like contour having a crest portion. At least one power or communication receptacle is connected to the receptacle attachment member. The receptacle attachment member has a central portion and the crest portion of the wave-like contour is at the central portion of the receptacle attachment member. Covers are movably attached to the upper, peripheral portion. Each cover corresponds to a respective half of the frame. A lighting device is attached to the receptacle attachment member to illuminate the interior region of the frame.

16 Claims, 9 Drawing Sheets

POWER AND COMMUNICATION RECEPTACLE TROUGH WITH RECEPTACLE ATTACHMENT MEMBER HAVING WAVE-LIKE CONTOUR

CROSS-REFERENCE TO RELATED APPLICATIONS

This application claims the benefit of U.S. Provisional Application Nos. 60/934,220, filed Jun. 11, 2007, and 60/943, 362, filed Jun. 12, 2007. The entire disclosures of the aforesaid application Nos. 60/934,220 and 60/943,362 are hereby incorporated by reference.

TECHNICAL FIELD

The present invention generally relates to a power and communication receptacle trough for use with an article of furniture such as a table, desk, work bench, work station or similar article.

BACKGROUND ART

Troughs containing power and communication outlets or receptacles are known in the art. Typical power and communication receptacle troughs or similar devices are described in U.S. Pat. Nos. 4,654,756, 4,792,881, 5,230,552, 5,231,562, 5,709,156 and 6,397,762. A typical trough has a housing or frame that is mounted or positioned within an opening in the work surface of an article of furniture, such as a table, desk, work bench, etc. The housing or frame defines an internal region or space for positioning a receptacle panel. The receptacle panel is typically located in the bottom portion of the internal region or space and is attached to the housing or frame. Power and communication receptacles are connected to the receptacle panel. The receptacle panel has a flat geometry. A cover is movably or pivotally attached to the housing or frame. In order to have access to the power and communication receptacles, the user simply opens the cover.

DISCLOSURE OF THE INVENTION

The present invention is directed to a power and communication receptacle trough that comprises a frame that is sized to fit within an opening in a work surface of an article of furniture, such as a table, desk, workbench, work station or similar article. The frame comprises an upper, peripheral portion and a plurality of walls downwardly extending from the upper, peripheral portion. The frame defines an interior region. A receptacle attachment member is disposed within the interior region of the frame and is attached to the frame. The receptacle attachment member has a wave-like contour having a crest portion. At least one power and/or communication receptacle is connected to the receptacle attachment member. The receptacle attachment member has a central portion and the crest portion of the wave-like contour is at the central portion of the receptacle attachment member. In a preferred embodiment, the frame has a generally rectangular shape. Cover members are movably or hingedly attached to the upper, peripheral portion. Each cover corresponds to a respective half of the trough. The covers can be positioned in a closed position to conceal the receptacle attachment member when the trough is not being used, and positioned in the opened position so as to expose the receptacle attachment member. If only one portion of the receptacle attachment member is being used, then the cover member corresponding to that portion of the receptacle attachment member is positioned in the open position and the cover member corresponding to the unused portion of the receptacle attachment member can be positioned in the closed position.

Further features and advantages of the present invention are described in the ensuing description.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

BEST MODE FOR CARRYING OUT THE INVENTION

The ensuing detailed description is exemplary of the preferred embodiment of the present invention, the scope of which is limited only by the claims appended hereto.

Figure 1:
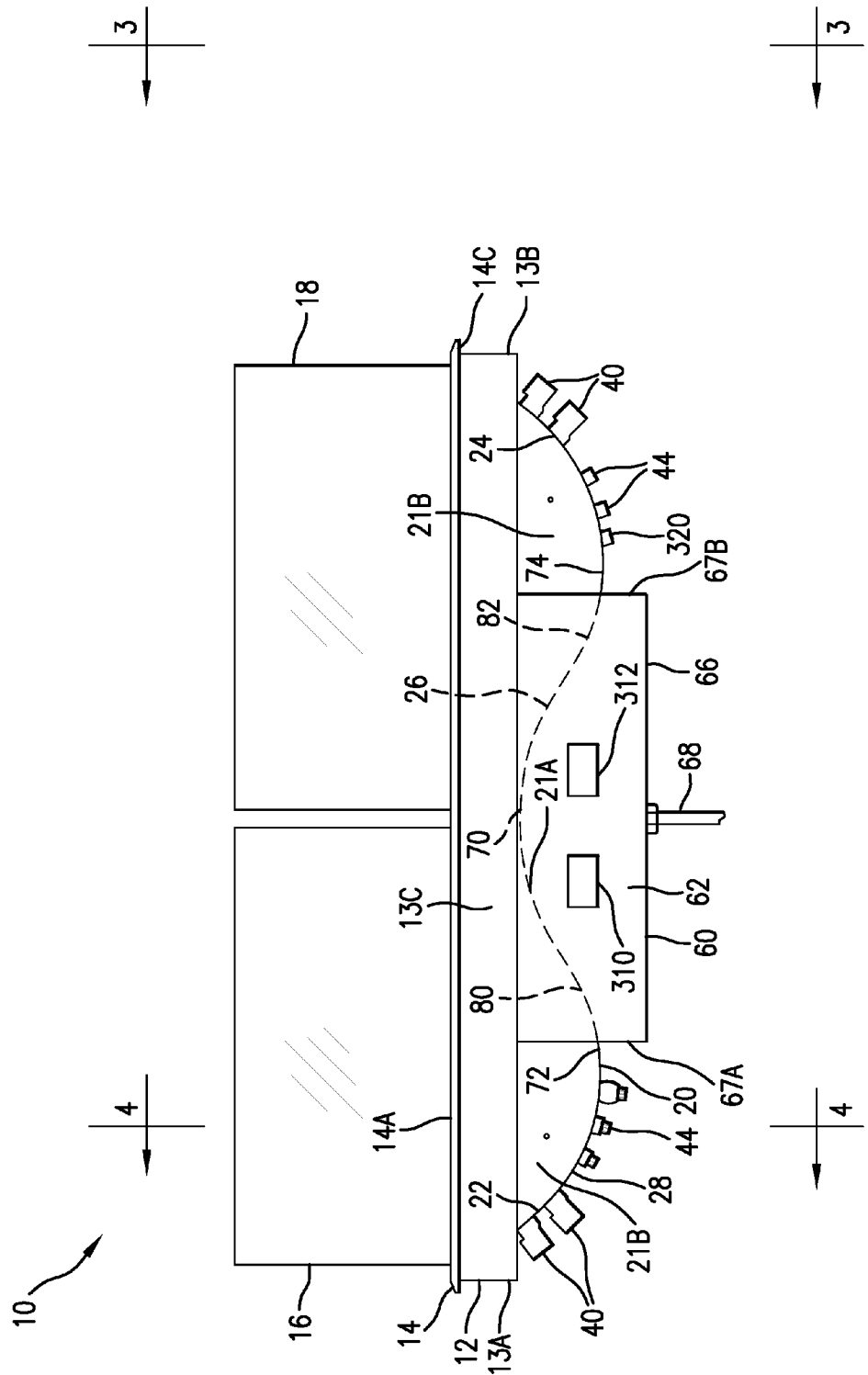
FIG. 1 is a side view, in elevation, of a power and communication receptacle trough in accordance with one embodiment of the present invention.
Figure 2:
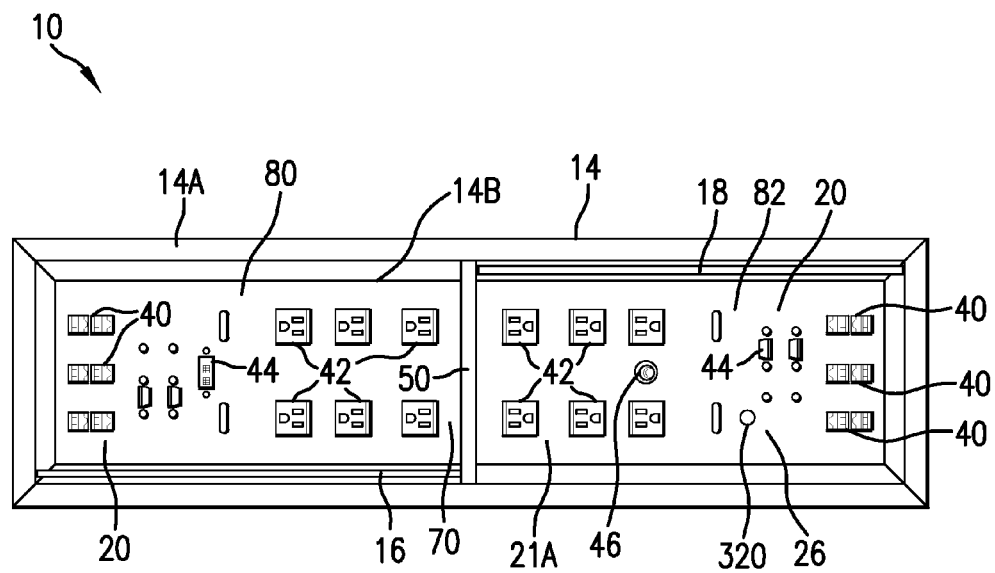
FIG. 2 is a top plan view of the power and communication receptacle trough of FIG. 1.
Figure 10:
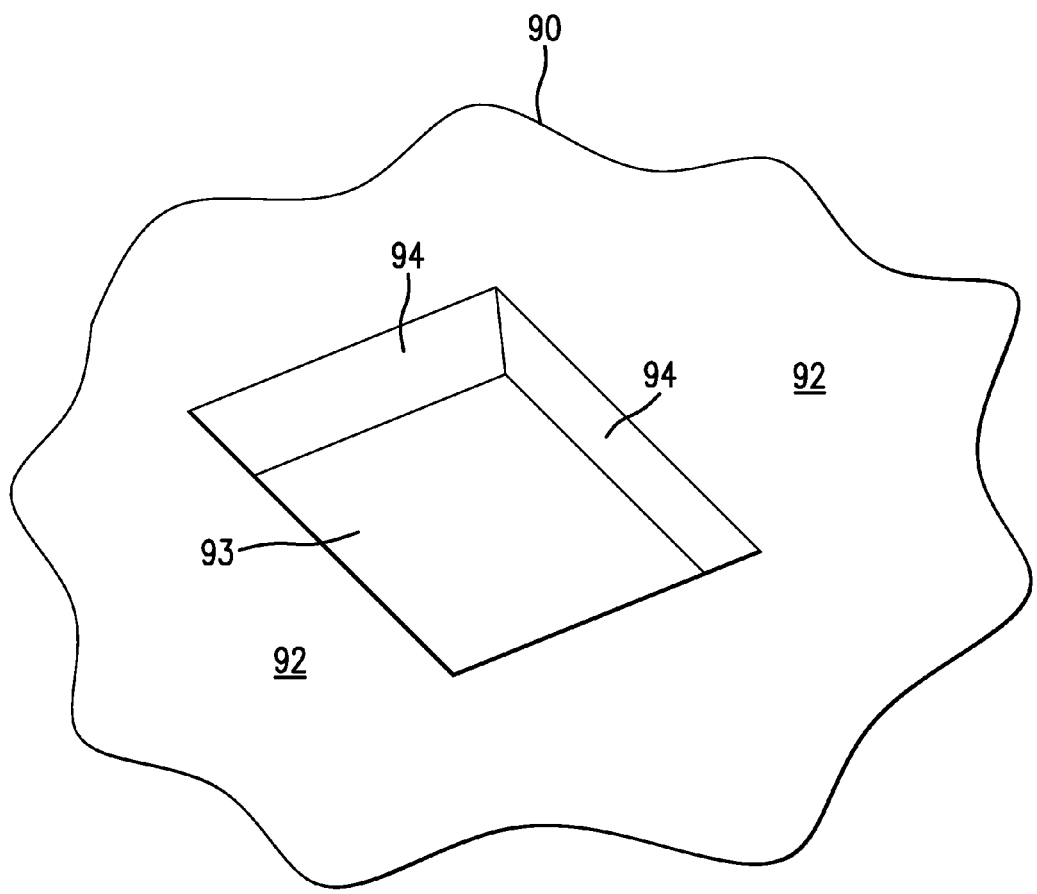
FIG. 10 is a perspective view of a portion of an article of furniture having a work surface and an opening in the work surface, the opening being sized to receive the power and communication receptacle trough of the present invention.

Referring to FIG. 1, there is shown power and communication trough 10 in accordance with one embodiment of the present invention. Power and communication receptacle trough 10 generally comprises frame 12 that comprises downwardly extending walls 13A, 13B, 13C and 13D, and upper, peripheral portion 14. Upper, peripheral portion 14 is attached to walls 13A, 13B, 13C and 13D. Upper, peripheral portion 14 comprises top portion 14A, a stepped portion 14B, and flanged or extending portion 14C. When frame 12 is positioned within an opening in a work surface of an article of furniture, flanged or extending portion 14C contacts and sits upon the work surface. Trough 10 further includes a pair of covers 16 and 18 that are pivotally or hingedly attached to upper, peripheral portion 14 by any suitable technique or means. In one embodiment, hinges are used to attach covers 16 and 18 to upper, peripheral portion 14. In a preferred embodiment, covers 16 and 18 are identical in size, shape and construction. Referring to FIGS. 1, 2 and 10, trough 10 is configured to be used with article of furniture 90 which has work surface 92 and opening 93 in the work surface 92. Opening 93 defines sides or edges 94. In one embodiment, fasteners such as screws or nails are used to attach downwardly extending walls 13A, 13B, 13C and 13D to sides 94. In another embodiment, a clamping device (not shown) is used to clamp the entire frame 12 to the article of furniture. Other techniques may be used to attach frame 12 to the article of furniture. If the materials used to fabricate trough 10 are relatively heavy, the entire weight of trough 10 may be sufficient to maintain the trough 10 in a stationary, secure position in the article of furniture without the use of any fasteners or clamping devices.

Figure 3:
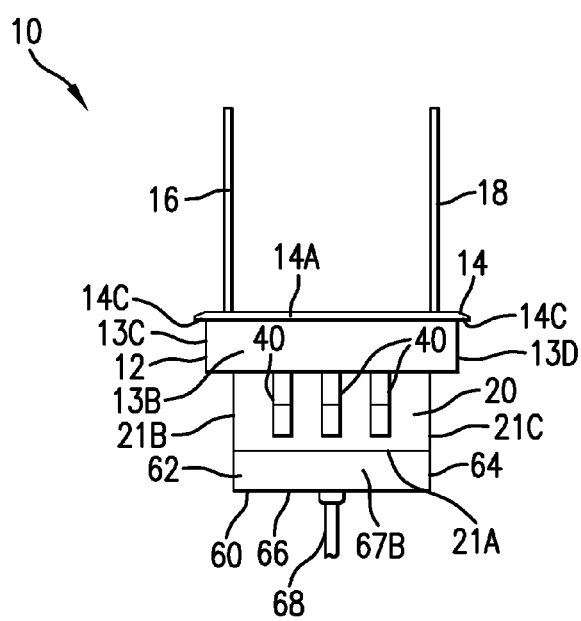
FIG. 3 is a view taken along line 3-3 of FIG. 1.

Referring to FIGS. 1, 2 and 3, trough 10 further comprises receptacle attachment member 20 that comprises base 21A, sidewalls 21B, 21C, and end portions 22 and 24. End portion 22 is attached to interior wall 30 of downwardly extending wall 13A of frame 12. Similarly, end portion 24 is attached to the interior wall (not shown) of downwardly extending wall 13B. Fasteners 32 are used to attach end portions 22 and 24 to downwardly extending walls 13A and 13B, respectively. This is just one technique of attaching end portions 22 and 24 to walls 13A and 13B, respectively. It is to be understood that end portions 22 and 24 can be attached to frame 12 via other techniques or configurations. Sidewalls 21B and 21C are attached to sidewalls 13C and 13D, respectively, of frame 12 by any suitable technique, e.g. screws, rivets, etc.

Referring to FIGS. 1-5, in accordance with one embodiment of the present invention, receptacle attachment member 20 has a wave-like shape or contour. Receptacle attachment member 20 is discussed in detail in the ensuing description. Trough 10 further comprises a plurality of communication receptacles 40, a plurality of power receptacles 42 and a plurality of data signal receptacles 44 that are attached or connected to receptacle attachment member 20. Communication receptacles 40 can be configured as RJ45 receptacles suitable for telephone or internet connections. Each receptacle 40 has rear connectors that are configured to be connected to wire or cables that are connected to a telephone or internet network. Power receptacles 42 are configured to provide A.C. voltage (e.g. 117 VAC) to power office or laboratory equipment, e.g. personal computers, oscilloscopes, etc. Each power receptacle 42 has rear connectors that are configured to be connected to wires or cables that are part of power cord 68 which is described in the ensuing description. Each data receptacle 44 is configured as a typical multi-bit digital signal connector used with personal computers or computer peripheral devices, e.g. RS-232, RS-422 and RS-485. It is to be understood that other types of connectors and receptacles can be connected to receptacle attachment member 20 as well (e.g. USB, video, XLR, etc.). Trough 10 includes circuit breaker 46 is mounted to receptacle attachment member 20 and is configured to provide overload protection. As shown in FIG. 2, frame 12 includes support member 50 that spans the central portion of frame 12. Trough 10 further includes power cover 60 that comprises sidewalls 62 and 64, horizontal base 66, and end walls 67A and 67B. Power cover 60 totally encloses the underside of receptacles 42 so as to prevent contact between the users and wires or connectors carrying 117 VAC. Trough 10 also includes power cord 68 that is electrically connected to receptacles 42 and to a power or energy source (not shown) and thus, provides electrical power to receptacles 42. In one embodiment, power cord 68 extends through horizontal base 66. In another embodiment, power cord 68 extends through sidewall 67B.

Referring to FIGS. 1-4, in accordance with one embodiment of the present invention, receptacle attachment member 20 has a wave-like shape or contour which comprises crest or peak portion 70 and lower portions 72 and 74. The portion of receptacle attachment member 20 that extends from end portion 22 to crest 70 defines one half of receptacle attachment member 20. The portion of receptacle attachment member 20 that extends from end portion 24 to crest 70 defines the other half of receptacle attachment member 20. One advantage of receptacle attachment member 20 is that since receptacle attachment member 20 can be viewed as having two halves 80 and 82, it is easier for a user to identify a particular receptacle to which a specific piece of equipment is plugged. For example, a user may wish to plug all computer related equipment into the receptacles of half 80 and all oscilloscopes and meters into receptacles of half 82. Another advantage of receptacle attachment member 20 is that two individuals that are simultaneously using the same article of furniture can also simultaneously use trough 10 without being confused as to whose equipment is plugged into a particular receptacle. For example, one person could plug all of his or her equipment into the receptacles on half 80 of receptacle attachment member 20, and the other person can plug all of his or her equipment into half 82 of receptacle attachment member 20. There would be no confusion as to who plugged a piece of equipment into a particular receptacle.

Figure 6:
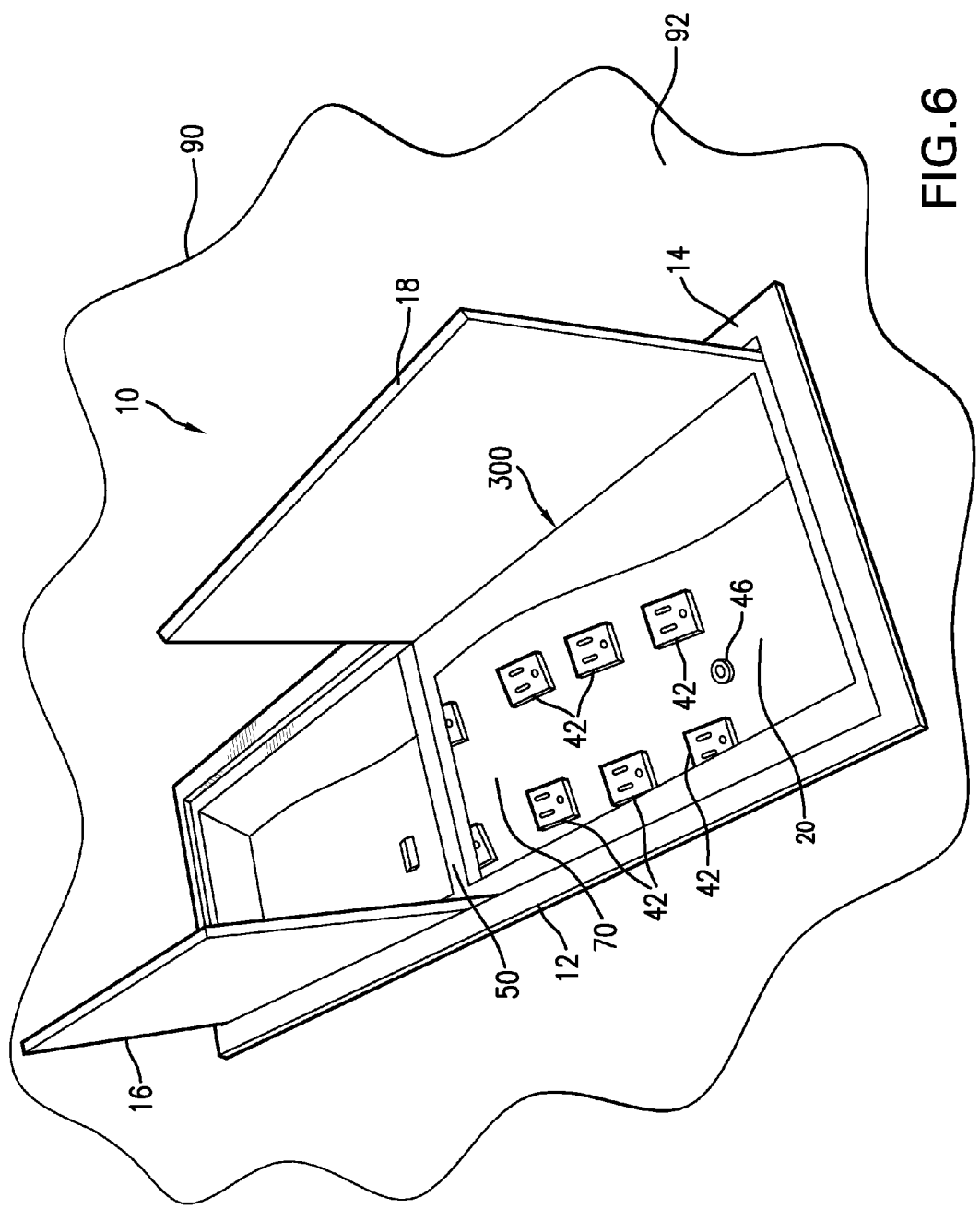
FIG. 6 is a perspective view showing the power and communication receptacle trough of FIG. 1 positioned within an opening in a work surface of an article of furniture wherein both cover members of the trough are opened to expose the receptacle attachment member.
Figure 7:
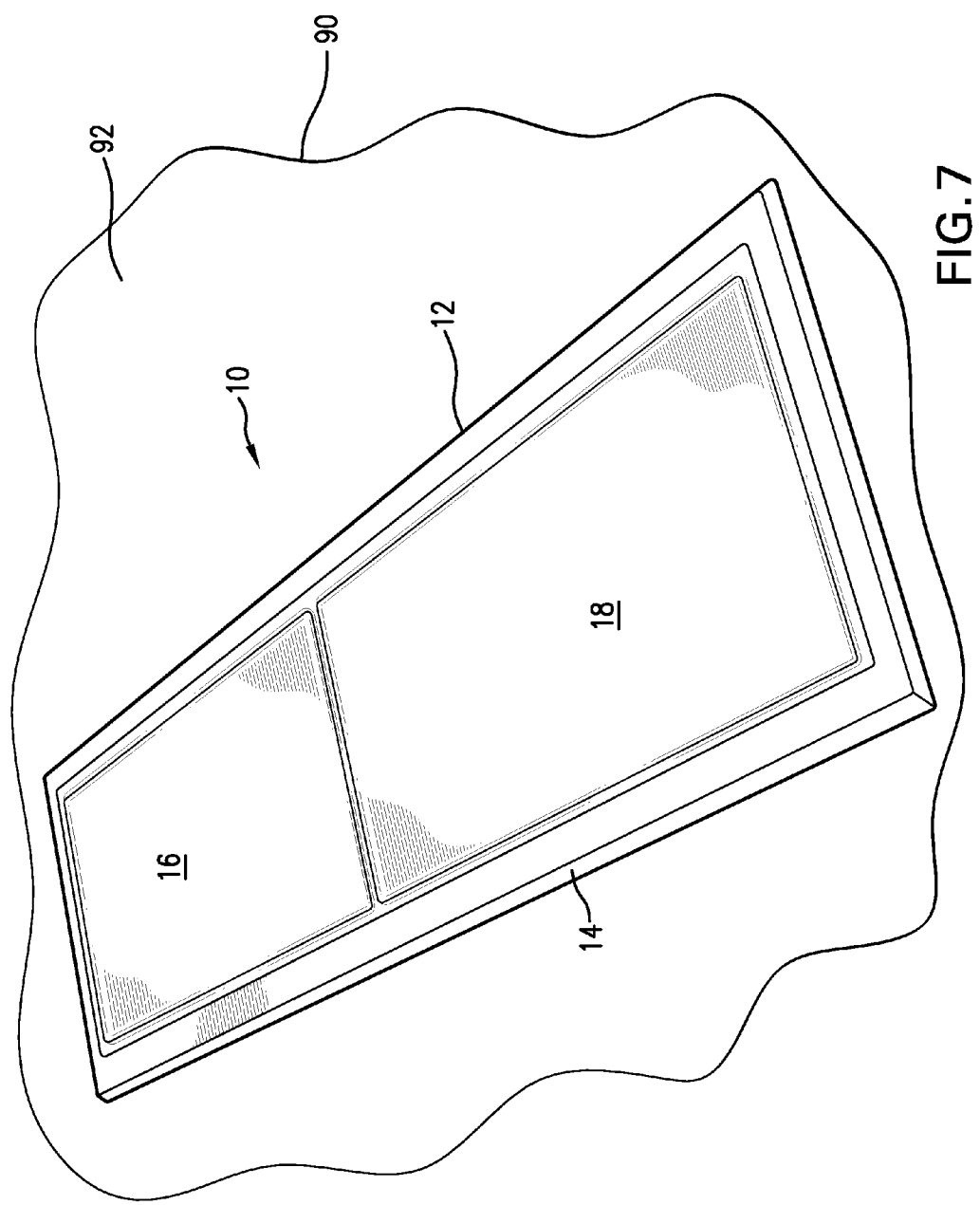
FIG. 7 is a perspective view of the power and communication receptacle trough positioned within the opening in the work surface of the article of furniture as shown in FIG. 6 wherein both cover members of the trough are closed to conceal the receptacle attachment member.

Referring to FIGS. 6, 7 and 10, power and communication receptacle trough 10 is positioned within opening 93 of article of furniture 90. Sidewalls 13A, 13B, 13C and 13D are attached to sides 94 of opening 93. Flanged portion 14C of upper, peripheral portion 14 physically contacts and sits upon work surface 92 when frame 12 is completely positioned within opening 93. In order to facilitate viewing of opening 93, trough 10 is not shown in FIG. 10.

Figure 4:
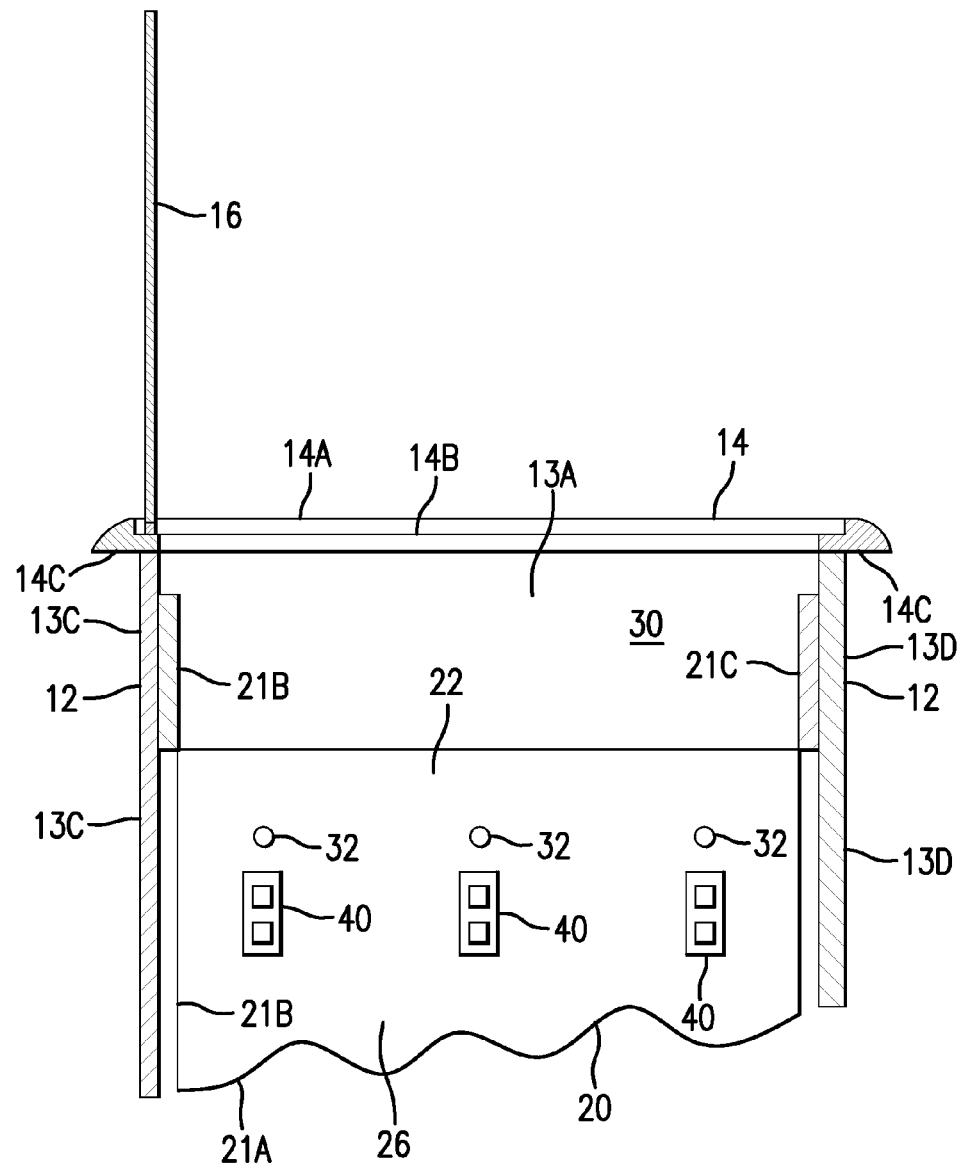
FIG. 4 is a view taken along line 4-4 of FIG. 1.
Figure 5:
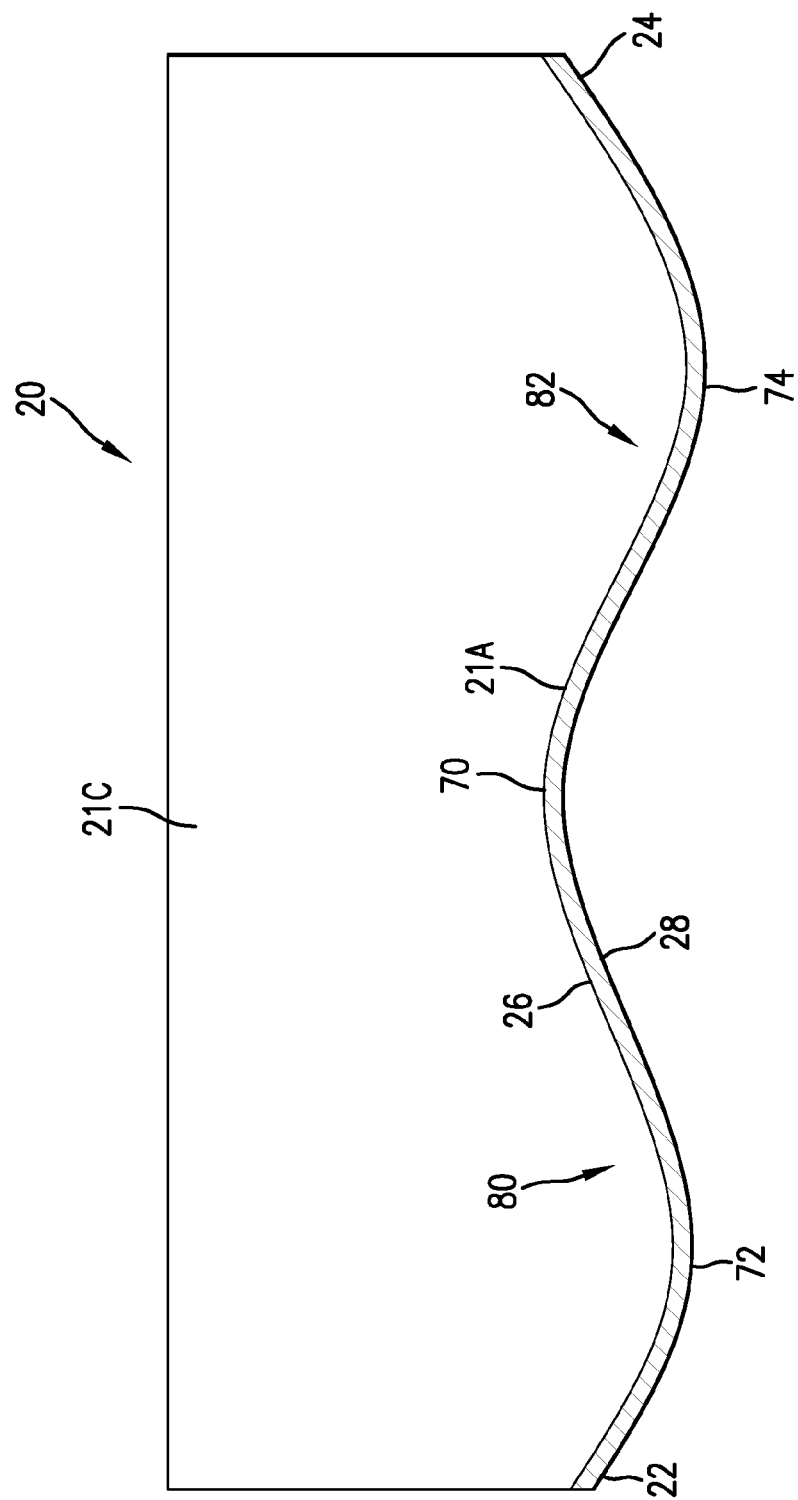
FIG. 5 is a side view, in cross-section, of the receptacle attachment member depicted in FIG. 1, the receptacles not being shown in the view in order to facilitate viewing of the wave-like contour of the receptacle attachment member.

Referring to FIGS. 2, 4 and 5, trough 10 utilizes two covers 16 and 18 instead of one cover. This is because the user may only need to use one half, either half 80 or half 82, of receptacle attachment member 20. Cover 16 is pivotally or hingedly attached to one side of upper, peripheral portion 14 of frame 12, and cover 18 is pivotally or hingedly attached to the opposite side of upper, peripheral portion 14. The covers 16 and 18 are arranged in this manner to accommodate persons on either side of the article of furniture. FIG. 6 shows both covers 16 and 18 in the open position. FIG. 7 shows both covers 16 and 18 in the closed position.

Figure 8:
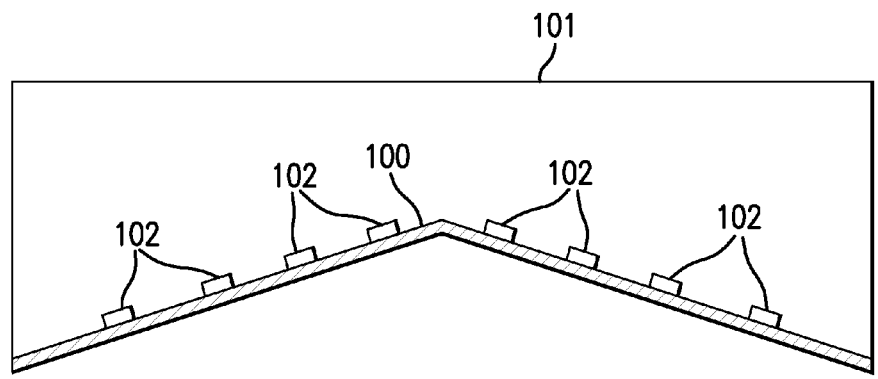
FIG. 8 is a side view, in cross-section, of a receptacle attachment member in accordance with another embodiment of the present invention.
Figure 9:
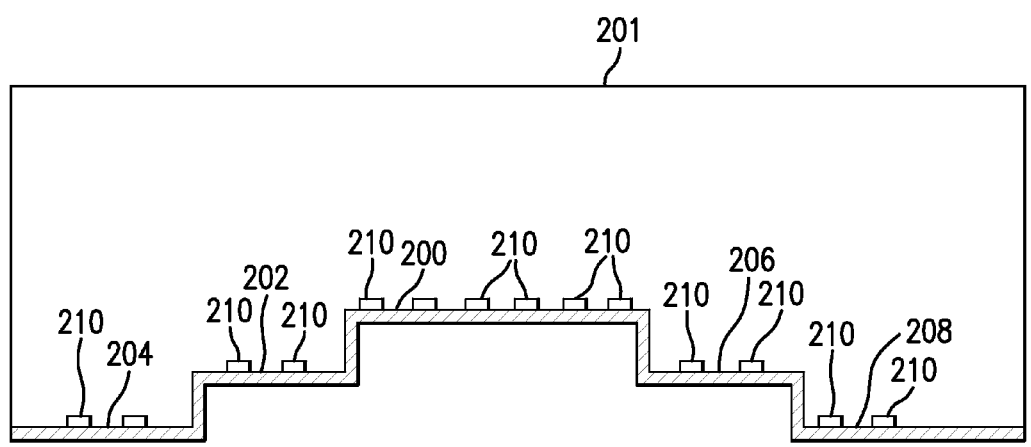
FIG. 9 is a side view, in cross-section, of a receptacle attachment member in accordance with a further embodiment of the present invention.

Although receptacle attachment member 20 has been described as having a wave-like shape or geometry, it is to be understood that receptacle attachment member 20 can be configured to have other geometries and contours that achieve the same advantages as described in the foregoing description. For example, in FIG. 8, there is shown receptacle attachment member 100 in accordance with another embodiment of the present invention. Receptacle attachment member 100 has a generally triangular shape. An additional advantage of this receptacle attachment member 100 is that in the event liquids are accidentally spilled on receptacle attachment member 100, the liquids will quickly run off the receptacle attachment member 100. Receptacle attachment member 100 includes a pair of sidewalls, one of which being sidewall 101. A plurality of power and communication receptacles 102 are attached to receptacle attachment member 100. In FIG. 9, there is shown receptacle attachment member 200 in accordance with a further embodiment of the present invention. Receptacle attachment member 200 comprises a pair of sidewalls, one of which being sidewall 201. Receptacle attachment member 200 is configured to have a stair-case or terraced shape configuration that comprises steps or terraces 202, 204, 206 and 208. A plurality of power and/or communication receptacles 210 are connected to receptacle attachment member 200. It is to be understood that frame 12 would have to be modified in order to accommodate either receptacle attachment member 100 or receptacle attachment member 200. For example, downwardly extending walls 13A and 13C would have to be extended downward an additional distance so that the ends of receptacle attachment members 100 or 200 could be attached thereto.

Figure 11:
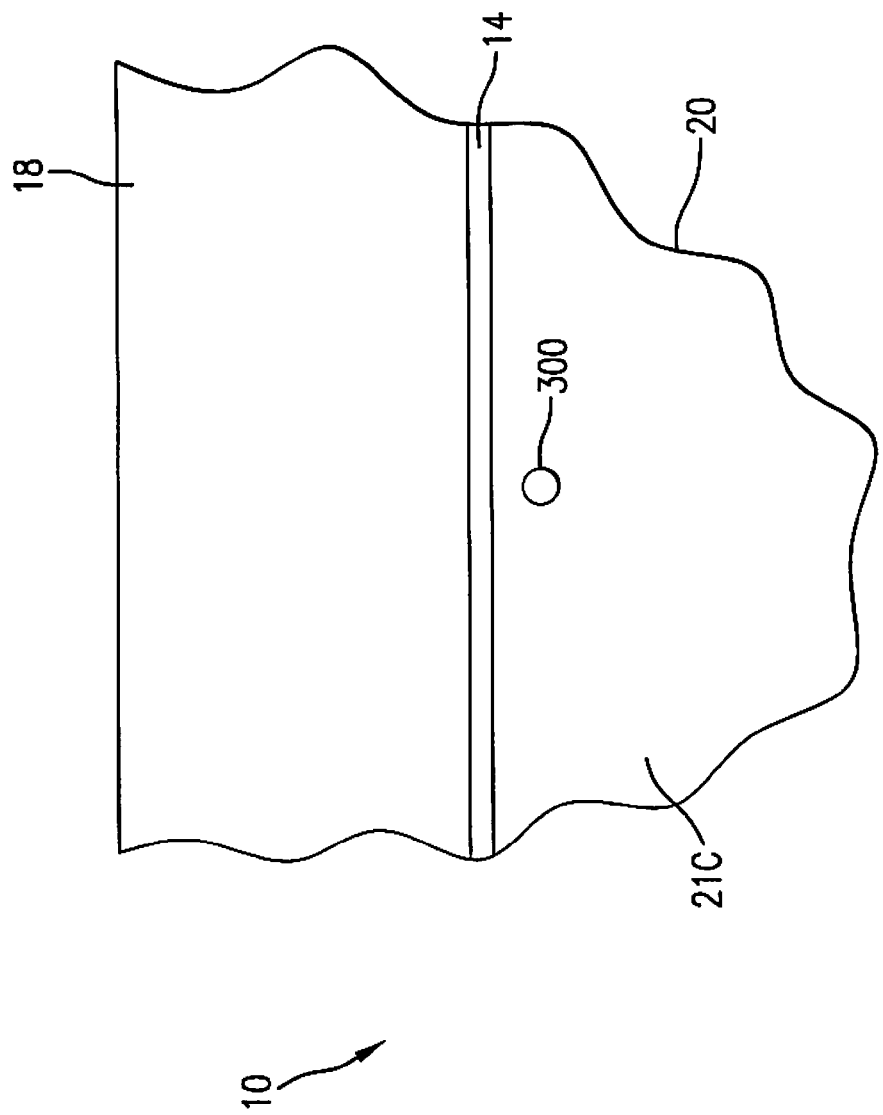
FIG. 11 is a partial view, in elevation, of a portion of the interior region of the power and communication receptacle trough, the view showing a light device that illuminates the receptacle attachment member.

Referring to FIGS. 1, 6 and 11, power and communication receptacle trough 10 further comprises at least one light device 300. In one embodiment, each light device 300 is configured as an LED. As shown in FIG. 11, one of the light devices 300 is attached to the upper portion of sidewall 21C of receptacle attachment member 20. In one embodiment, there are four light devices 300 wherein two light devices 300 are attached to the upper portion of sidewall 21C and the other two light devices 300 attached to the upper portion of sidewall 21B of receptacle attachment member 20. The lighting devices 300 illuminate the interior of trough 10 in the event the room is dark or dimly lit. Trough 10 further comprises power receptacle 310 and step-down transformer 312 that are attached to sidewall 62 of power cover 60. Power receptacle 310 is electrically connected to power cord 68 and to step-down transformer 312. Trough 10 further comprises switch 320 that is attached to receptacle attachment member 20 and electrically connected to step-down transformer 312. Each light device 300 is electrically connected to switch 320. The power cord 68 supplies electrical power to power receptacle 310. Step-down transformer 312 reduces this power to a voltage that is suitable for light devices 300. For example, in one embodiment, each light device 300 is configured to operate on 12 volts. Switch 320 has a first state that provides the stepped-down voltage to light devices 300 and a second state that disconnects the light devices 300 from the stepped-down voltage.

A variety of materials may be used to fabricate apparatus 10, e.g. plastic, metals, resins, composites, etc.

The size of power and communication receptacle trough 10 may be varied depending upon the application.

While the foregoing description is exemplary of the present invention, those of ordinary skill in the relevant arts will recognize the many variations, alterations, modifications, substitutions and the like are readily possible, especially in light of this description, the accompanying drawings and the claims drawn hereto. In any case, because the scope of the invention is much broader than any particular embodiment, the foregoing detailed description should not be construed as a limitation of the present invention, which is limited only by the claims appended hereto.

What is claimed is:

1. A power and communication receptacle trough comprising:
   a frame comprising an upper, peripheral portion and a plurality of walls downwardly extending from the upper, peripheral portion, the frame defining an interior region; and
   a receptacle attachment member disposed within the interior region of the frame and attached to the frame, the receptacle attachment member having a sinusoidal cross-section which has a crest that defines a central portion of the receptacle attachment member.

2. The power and communication receptacle trough according to claim 1 further comprising a support member that is attached to the frame and which spans the interior region of the frame, the support member being generally located over the central portion of the receptacle attachment member.

3. The power and communication receptacle trough according to claim 1 further comprising at least one power receptacle connected to the receptacle attachment member.

4. The power and communication receptacle trough according to claim 1 further comprising at least one communication receptacle connected to the receptacle attachment member.

5. The power and communication receptacle trough according to claim 1 further comprising at least one data signal receptacle connected to the receptacle attachment member.

6. The power and communication receptacle trough according to claim 1 wherein the frame has a generally rectangular shape.

7. The power and communication receptacle trough according to claim 1 further comprising a pair of covers movably attached to the upper, peripheral portion, each cover corresponding to a respective half of the frame.

8. The power and communication receptacle trough according to claim 7 wherein the upper, peripheral portion has a first lengthwise side and a second lengthwise side and wherein one cover is movably attached to the first lengthwise side and the other cover is movably attached to the second lengthwise side.

9. The power and communication receptacle trough according to claim 1 further comprising means for attaching the frame to the article of furniture.

10. The power and communication receptacle trough according to claim 1 further comprising a circuit breaker attached to the receptacle attachment member to provide overload protection for the at least one power receptacle.

11. The power and communication receptacle trough according to claim 1 wherein the at least one power receptacle has connectors for connecting thereto electrical power wires and wherein the power and communication receptacle trough further includes a cover member attached to the frame to enclose the connectors so as to shield the connectors and electrical power wires from a user.

12. The power and communication receptacle trough according to claim 1 further comprising at least one lighting device attached to the receptacle attachment member to illuminate the interior region of the frame.

13. The power and communication receptacle trough according to claim 12 wherein the at least one lighting device comprises an LED.

14. The power and communication receptacle trough according to claim 12 further comprising a step-down power transformer having an input for connection to an AC power source and an output that provides a relatively lower AC power output for powering the at least one lighting device.

15. The power and communication receptacle trough according to claim 14 further comprising a switch having a first state that electrically connects the output power of the step-down power transformer to the at least one lighting device and a second state that electrically disconnects the at least one lighting device from the step-down transformer.

16. A power and communication receptacle trough comprising:
   a frame comprising an upper, peripheral portion and a plurality of walls downwardly extending from the upper, peripheral portion, the frame defining an interior region;

a receptacle attachment member disposed within the interior region of the frame and attached to the frame, the receptacle attachment member having a sinusoidal cross-section which has a crest that defines a central portion of the receptacle attachment member;

at least one power receptacle connected to the receptacle attachment member;

at least one communication receptacle connected to the receptacle attachment member;

at least one data signal receptacle connected to the receptacle attachment member; and a circuit breaker attached to the receptacle attachment member to provide overload protection for the at least one power receptacle.

\* \* \* \* \*